United States Patent
Jendrix

(10) Patent No.: US 6,331,097 B1
(45) Date of Patent: Dec. 18, 2001

(54) METHOD AND APPARATUS FOR PURGING TURBINE WHEEL CAVITIES

(75) Inventor: Richard W. Jendrix, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/410,239

(22) Filed: Sep. 30, 1999

(51) Int. Cl.[7] ...................................................... F01D 5/08
(52) U.S. Cl. ................. 416/96 R; 416/97 R; 416/219 R; 416/220 R
(58) Field of Search .................................... 415/115, 180, 415/230; 416/96 R, 97 R, 219 R, 200 R, 219 A, 248, 95

(56) References Cited

U.S. PATENT DOCUMENTS

| | | | |
|---|---|---|---|
| 4,292,008 | * 9/1981 | Grosjean et al. | 415/115 |
| 4,820,116 | * 4/1989 | Hovan et al. | 415/115 |
| 5,340,278 | * 8/1994 | Magowan | 416/96 R |
| 5,388,962 | 2/1995 | Wygle et al. | 416/95 |
| 5,478,207 | 12/1995 | Stec | 416/219 R |
| 5,503,528 | * 4/1996 | Glezer et al. | 416/96 R |
| 5,630,703 | 5/1997 | Hendley et al. | 416/95 |
| 5,800,124 | * 9/1998 | Zelesky | 416/95 |
| 6,017,189 | * 1/2000 | Judet et al. | 416/97 R |

* cited by examiner

Primary Examiner—Edward K. Look
Assistant Examiner—Ninh Nguyen
(74) Attorney, Agent, or Firm—Andrew C. Hess; Rodney M. Young

(57) ABSTRACT

A turbine rotor for a gas turbine engine includes a rotor disk having a plurality of circumferentially alternating dovetail slots and disk posts and a plurality of blades disposed in the dovetail slots. A cooling air plenum is defined in the portion of each dovetail slot located radially inward of the corresponding blade. Air from the plenums is directed through slots formed in axial surfaces of the blades or disk posts into an adjacent wheel cavity, thereby purging the wheel cavity.

19 Claims, 5 Drawing Sheets

METHOD AND APPARATUS FOR PURGING TURBINE WHEEL CAVITIES

BACKGROUND OF THE INVENTION

This invention relates generally to gas turbine engines and more particularly to purging forward or aft wheel cavities in the turbine sections of such engines.

A high bypass ratio turbofan engine used for powering an aircraft in flight typically includes a fan, a low pressure compressor or booster, a high pressure compressor, a combustor, a high pressure turbine and a low pressure turbine in axial flow relationship. A portion of the air entering the engine passes through the fan, booster and high pressure compressor, being pressurized in succession by each component. The compressed air exiting the high pressure compressor, commonly referred to as the primary or core gas stream, then enters the combustor where the pressurized air is mixed with fuel and burned to provide a high energy gas stream. However, prior to entering the combustor a portion of the primary or core flow is diverted to provide a source of cooling air for various high temperature components, such as those found in the high pressure turbine. After exiting the combustor, the high energy gas stream then expands through the high pressure turbine where energy is extracted to operate the high pressure compressor, which is drivingly connected to the high pressure turbine. The primary gas-stream then enters the low pressure turbine where it is further expanded, with energy extracted to operate the fan and booster, which are drivingly connected to the low pressure turbine. The remainder of the air flow (other than the primary flow) that enters the engine passes through the fan and exits the engine through a system comprising annular ducts and a discharge nozzle, thereby creating a large portion of the engine thrust.

The high pressure turbine typically includes one or two stages, while the low pressure turbine ordinarily has a larger number of stages. Each stage generally includes a rotor and a stator. The rotor comprises a rotor disk that rotates about the centerline axis of the engine and supports a plurality of blades that extend radially into the primary gas stream. The stator includes a row of stationary nozzles that direct the primary gas stream in such a manner that the rotor blades can do work. In a multi-stage turbine, the blades of one stage are located immediately downstream from the nozzles of that stage, and the nozzles of the next stage are located immediately downstream from the prior stage's blades. However, counterrotating engines (i.e., engines in which the high pressure turbine and the low pressure turbine rotate in opposite directions) typically do not have a stage of nozzles located between the last stage high pressure rotor and the first stage low pressure rotor.

Rotating labyrinth seals are commonly used in the high and low pressure turbines for sealing the above-mentioned cooling air from the primary gas stream. A rotating labyrinth seal is made up of a number of thin, tooth-like projections extending radially from a rotating engine part with their free ends disposed in sealing engagement with a stationary engine part or an engine part that is rotating in the opposite direction. However, because the unsealed spaces fore and aft of the rotor disks, commonly referred to as the wheel cavities, are in fluid communication with the primary gas stream, a flow of cooling air into the cavities is necessary to purge the cavities and prevent hot gas ingestion. A failure to maintain adequate purge flow can lead to significantly reduced part life of adjacent components.

Conventional engines rely on leakage through the labyrinth seals and the use of air holes in adjoining engine parts to supply purge air to the wheel cavities. However, the stress concentrations associated with the air holes create the potential for cracking and premature failure of rotating engine parts. Also, the machining necessary to form the air holes will incrementally increase the cost of manufacturing the parts.

Accordingly, there is a need for a means of properly purging the wheel cavities of a turbine section without the use of air holes.

SUMMARY OF THE INVENTION

The above-mentioned need is m et by the present invention which provides a turbine rotor having a wheel cavity located adjacent thereto. The turbine rotor includes a rotor disk having at least one disk slot formed therein and a blade disposed in the disk slot. The disk slot and the blade define a cooling air plenum, and a means for directing air from the plenum to the wheel cavity is provided. Preferably, the means for directing air to the wheel cavity is a slot formed in a forward or aft surface of the blade or disk.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
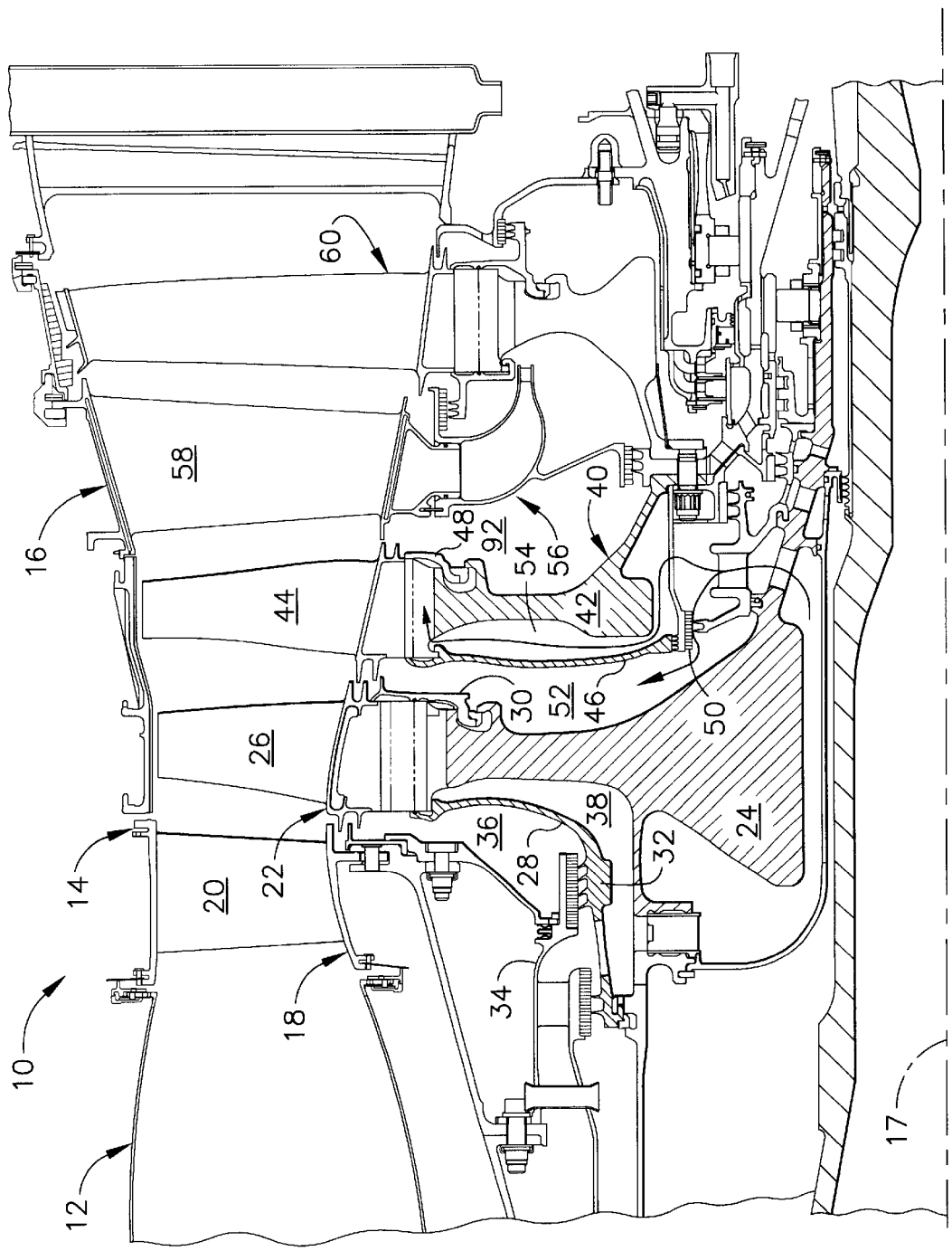
FIG. 1 is a fragmentary axial cross-sectional view of a gas turbine engine having the wheel cavity purging system of the present invention.

Referring to the drawings wherein identical reference numerals denote the same elements throughout the various views, FIG. 1 shows a portion of a gas turbine engine 10 including a combustor 12, a high pressure turbine 14 and a counterrotating low pressure turbine 16 arranged in axial flow relationship along a longitudinal centerline axis 17. The high pressure turbine 14 is drivingly connected to a conventional high pressure compressor (not shown) and the low pressure turbine 16 is drivingly connected to a conventional booster and fan (not shown). While a counterrotating engine is being used as an example to facilitate disclosure of the inventive concept of the present invention, it should be recognized that the present invention is applicable to any sort of gas turbine engine having wheel cavities that require purging.

The high pressure turbine 14 is a single stage turbine having a stator 18 including a plurality of nozzles 20 (only one shown in FIG. 1) and a rotor 22 located aft of the stator 18. The rotor 22 includes a rotor disk 24 that rotates about the centerline axis 17, a plurality of turbine blades 26 (only one shown in FIG. 1) extending radially outward from the disk 24, a forward retainer 28, and an aft retainer 30. The forward retainer 28 is a substantially annular member that is attached to the rotor disk 24 in a known manner so as to prevent the blades 26 from moving in an axially forward direction. Similarly, the aft retainer 30 is an annular member that prevents the blades 26 from moving in an axially aft direction. A rotating labyrinth seal 32 is disposed between the forward retainer 28 and the stationary support structure 34 of the high pressure stator 18 to prevent the undesired flow of cooling air bled off from a source such as the engine's high pressure compressor into a wheel cavity 36, which is located between the rotor 22 and the stator 18 and is in fluid communication with the primary gas stream. The forward retainer 28 and the rotor disk 24 define a plenum 38 into which cooling air is directed. This cooling air is used for both a subsequently described purpose as well as for cooling the blades 26 in a conventional manner.

The low pressure turbine 16 is a multi-stage turbine including a first stage that comprises a rotor 40, which is located immediately aft of the high pressure rotor 22 and rotates in the opposite direction thereof. The low pressure rotor 40 includes a rotor disk 42 that rotates about the centerline axis 17, a plurality of turbine blades 44 (only one shown in FIG. 1) extending radially outward from the disk 42, a forward retainer 46, and an aft retainer 48. The forward retainer 46 is an annular member that is attached to the rotor disk 42 in a known manner so as to prevent the blades 44 from moving in an axially forward direction. Similarly, the aft retainer 48 is an annular member that prevents the blades 44 from moving in an axially aft direction. A rotating labyrinth seal 50 is disposed between the forward retainer 46 and the oppositely rotating high pressure rotor 22 to prevent the undesired flow of cooling air into a wheel cavity 52, which is located between the high pressure rotor 22 and the first stage low pressure rotor 40 and is in fluid communication with the primary gas stream. The forward retainer 46 and rotor disk 42 define a plenum 54 into which the cooling air is directed. This cooling air is used for both a subsequently described purpose as well as for cooling the blades 44 in a conventional manner. The low pressure turbine 16 further includes subsequent stages, each having a stator 56 including a plurality of nozzles 58 (only one shown in FIG. 1) and a rotor 60 located aft of the stator 56 and drivingly connected to the first stage low pressure rotor 40.

Figure 2:
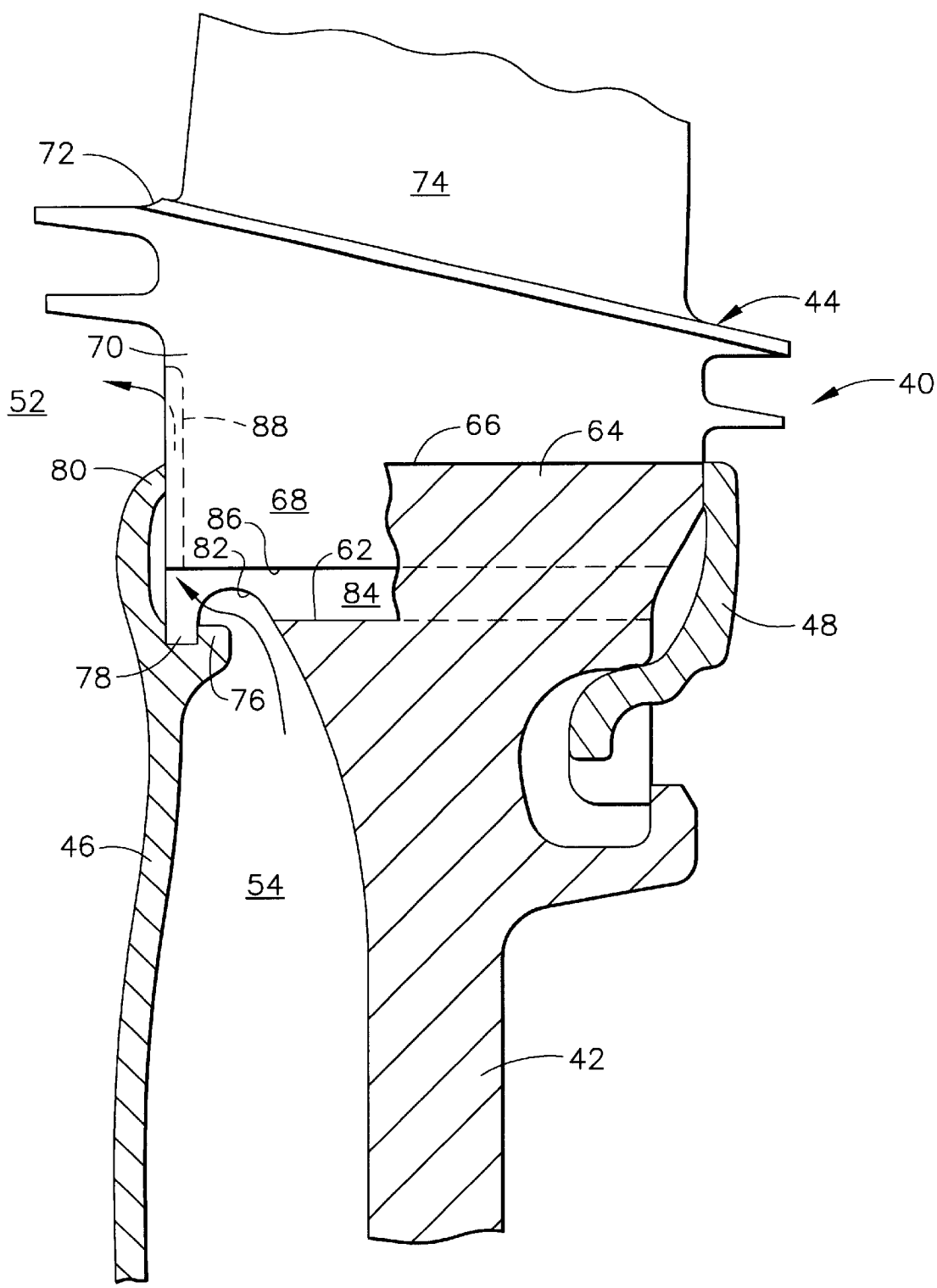
FIG. 2 is a detailed cross-sectional view of the low pressure turbine of the gas turbine engine of FIG. 1.
Figure 3:
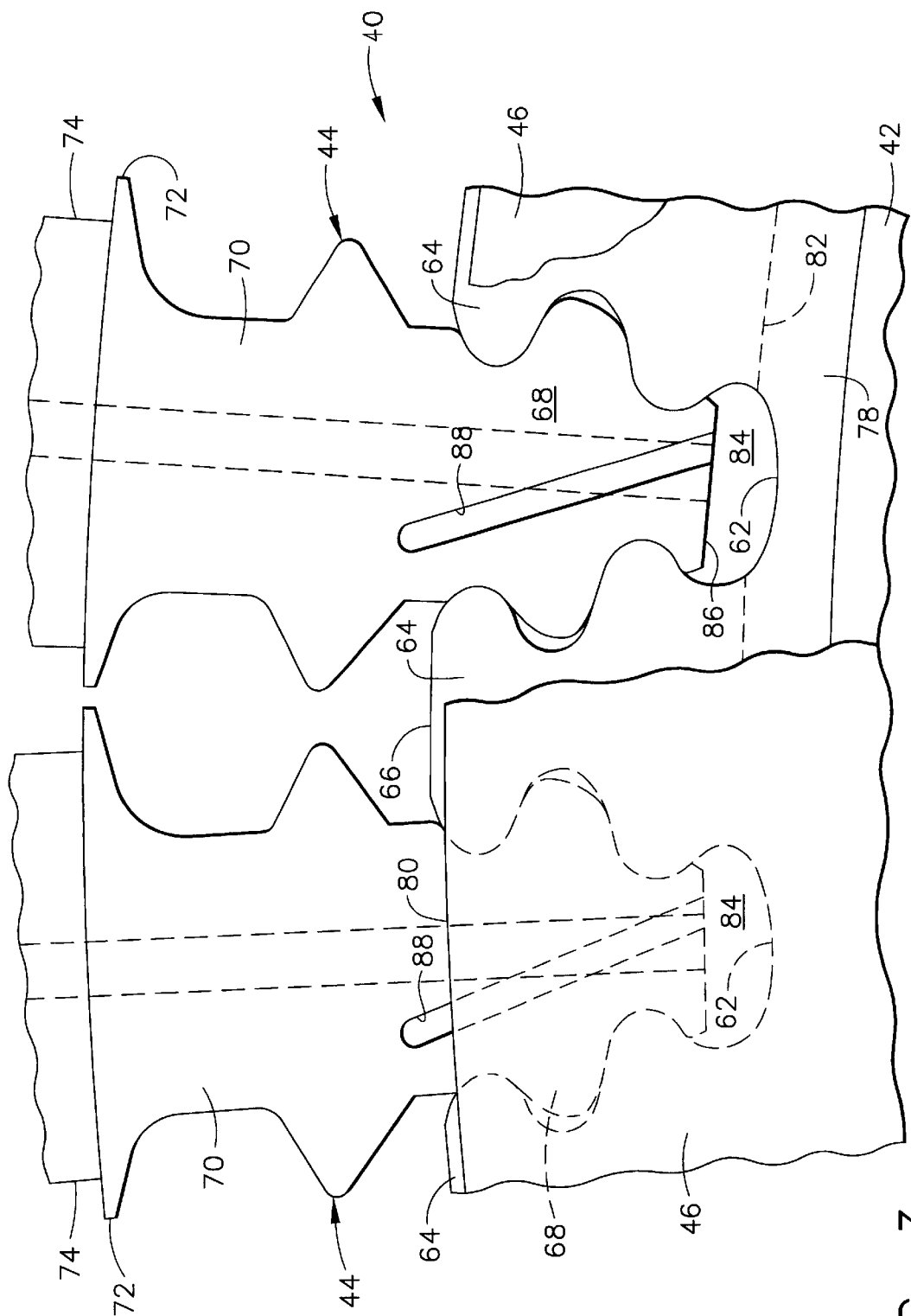
FIG. 3 is a fragmentary forward-looking-aft end view of the low pressure turbine.

Turning now to FIGS. 2 and 3, the wheel cavity purging arrangement of the present invention is shown in detail with respect to the first stage low pressure rotor 40. However, it should be recognized that the present invention is equally applicable to other parts of the engine 10, such as the high pressure rotor 22. As described above, the low pressure rotor 40 includes a rotor disk 42 having a plurality of turbine blades 44 extending radially outward therefrom. The rotor disk 42 has a plurality of circumferentially alternating dovetail slots 62 and posts 64, with each slot 62 defined by adjacent posts 64, disposed about its periphery 66. Each disk dovetail slot 62 receives a corresponding dovetail portion 68 of one of the blades 44. The disk slots 62 and the dovetail portions 68 are shown to have the so-called fir tree shape although other forms of blade-to-disk interlocking, which are known in the art, may be utilized. The blades 44 are axially loaded into the axially extending disk slots 62. Due to the complementary interlocking configurations of the disk slots 62 and the dovetail portions 68, the blades 44 are radially retained in the rotor disk 42. In addition to the dovetail portion 68, each blade 44 includes a shank portion 70 extending radially outward from the dovetail portion 68, a plate-like platform 72 attached to the outer end of the shank portion 70, and an airfoil portion 74 extending radially outward from the platform 72 and into the primary gas stream. The blade platforms 72 of adjacent blades 44 abut one another to form a radially inner boundary of the primary gas stream.

The forward retainer 46 has a radially extending annular flange 76 formed thereon for engaging a radially extending shoulder 78 formed on the forward surface of the rotor disk 40. Engagement of the flange 76 with the shoulder 78 secures the forward retainer 46 relative to the disk 40. The outer edge 80 of the forward retainer 46 abuts the forward surface of each blade dovetail portion 68 and disk post 64 so that the blades 44 are prevented from moving in an axially forward direction. The rotor disk 40 is provided with a cut back portion 82, aft of the shoulder 78, that intersects the bottoms of the disk slots 62, thereby providing fluid communication between the plenum 54 and each of a plurality of axially extending plenums 84 defined by the bottoms of the disk slots 62 and the radially inner surface 86 of the blade dovetail portions 68.

Each blade 44 has a substantially radially extending purge slot 88 formed in the forward surface thereof, with the purge slots 88 facing the forward retainer 46. Specifically, each purge slot 88 is formed in the forward surface of the dovetail portion 68 and the shank portion 70 of the corresponding blade 44. A first end of each purge slot 88 is located at the radially inner surface 86 of the dovetail portion 68 (or at least at a point radially inward of the outer edge 80 of the forward retainer 46) and is in fluid communication with a corresponding one of the plenums 84. The second end of each purge slot 88 is located at a point on the forward surface of the shank portion 70 that is radially outward of the outer edge 80 and in fluid communication with the wheel cavity 52 located between the high pressure rotor 22 and the first stage low pressure rotor 40. Accordingly, the purge slots 88 radially traverse the outer edge 80 of the forward retainer 46 and provide fluid communication between the plenums 84 and the wheel cavity 52.

During operation of the engine 10, cooling air is routed to the plenum 54 in a conventional manner from a source that may include but is not limited to the high pressure compressor of the engine 10. From the plenum 54, cooling air flows radially outward into the axially extending plenums 84. As is known in the art, a portion of the cooling air entering each plenum 84 is directed into internal cooling passages (not shown) of the corresponding blade 44 for cooling the blade 44. Another portion of the cooling air flows through the corresponding purge slot 88 into the wheel cavity 52. Because the cooling air is at a higher pressure than the primary gas stream at this point, it flows out of the wheel cavity 52 into the primary gas stream. Thus, the flow of air through the purge slots 88 will combine with any leakage past the labyrinth seal 50 to purge the wheel cavity 52 and prevent hot gas ingestion.

The total amount of flow through all of the purge slots 88 should be sufficient to adequately purge the wheel cavity 52, but not greater than necessary, since excessive purge flow would be detrimental to overall engine performance. Thus, the purge slots 88 are sized so as to assure a proper level of purge flow. Typically, the purge slots 88 will have a depth of approximately 50–100 mils. Preferably, but not necessarily, the purge slots 88 are formed as a part of the blade casting so as to avoid additional machining operations.

It should be noted that it is not necessary for each blade 44 to be provided with a purge slot 88. For example, every other blade 44 could be slotted as long as the purge slots 88 were sized to provide sufficient purge flow to the wheel cavity. However, by providing each blade 44 with a purge slot 88, only one blade configuration (i.e., slotted) is required to complete the rotor 40.

As seen in FIG. 3, the purge slots 88 are preferably disposed at an angle to a radius drawn from the engine centerline axis 17. By angling the purge slots 88 circumferentially in the direction of rotation of the rotor 40, cooling air exiting the purge slots 88 will be provided with a swirl that reduces the windage heat pickup in the wheel cavity 52 and will be forced back toward the high pressure rotor 22.

Figure 4:
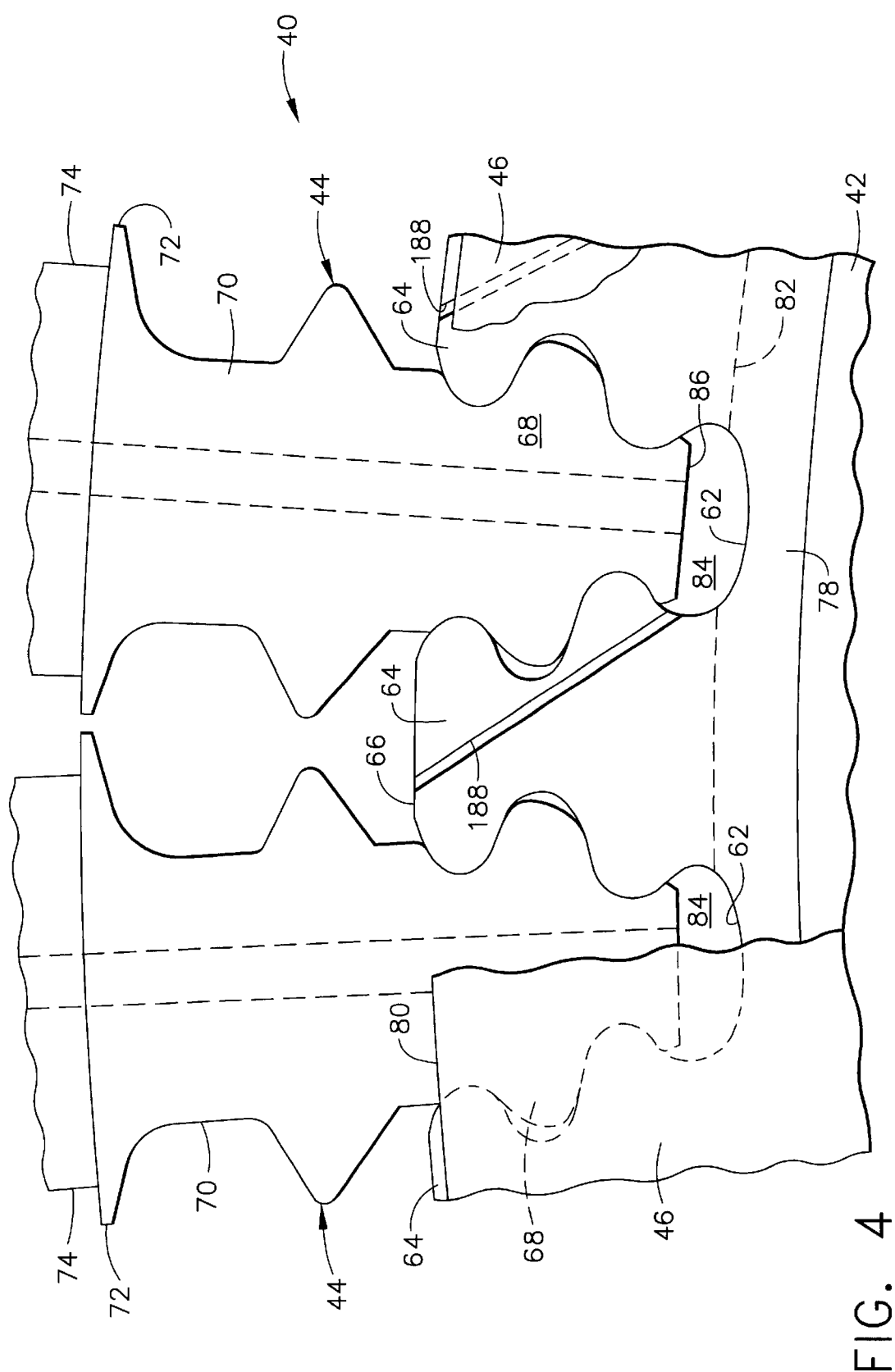
FIG. 4 is a fragmentary forward-looking-aft end view of a low pressure turbine showing an alternative embodiment of a wheel cavity purging system.

Referring to FIG. 4, an alternative embodiment of the present invention is shown. In this case, instead of slots formed in the blades 44, each disk post 64 has a substantially radially extending purge slot 188 formed in the forward surface thereof and facing the forward retainer 46. A first end of each purge slot 188 is located at a point radially inward of the outer edge 80 of the forward retainer 46 and adjacent to the adjoining disk slot 62 so as to be in fluid communication with a corresponding one of the plenums 84. The second end of each purge slot 188 is located radially outward of the outer edge 80 (preferably at the disk periphery 66) and in fluid communication with the wheel cavity 52. Accordingly, the purge slots 188 radially traverse the outer edge 80 of the forward retainer 46 and provide fluid communication between the plenums 84 and the wheel cavity 52. As in the first embodiment, the purge slots 188 are preferably angled circumferentially in the direction of rotor rotation. During engine operation, cooling air from the plenum 54 is directed into the plenums 84, and a portion of this air flows through the purge slots 188 into the wheel cavity 52 where it combines with any leakage past the labyrinth seal 50 to purge the wheel cavity 52 and prevent hot gas ingestion.

Figure 5:
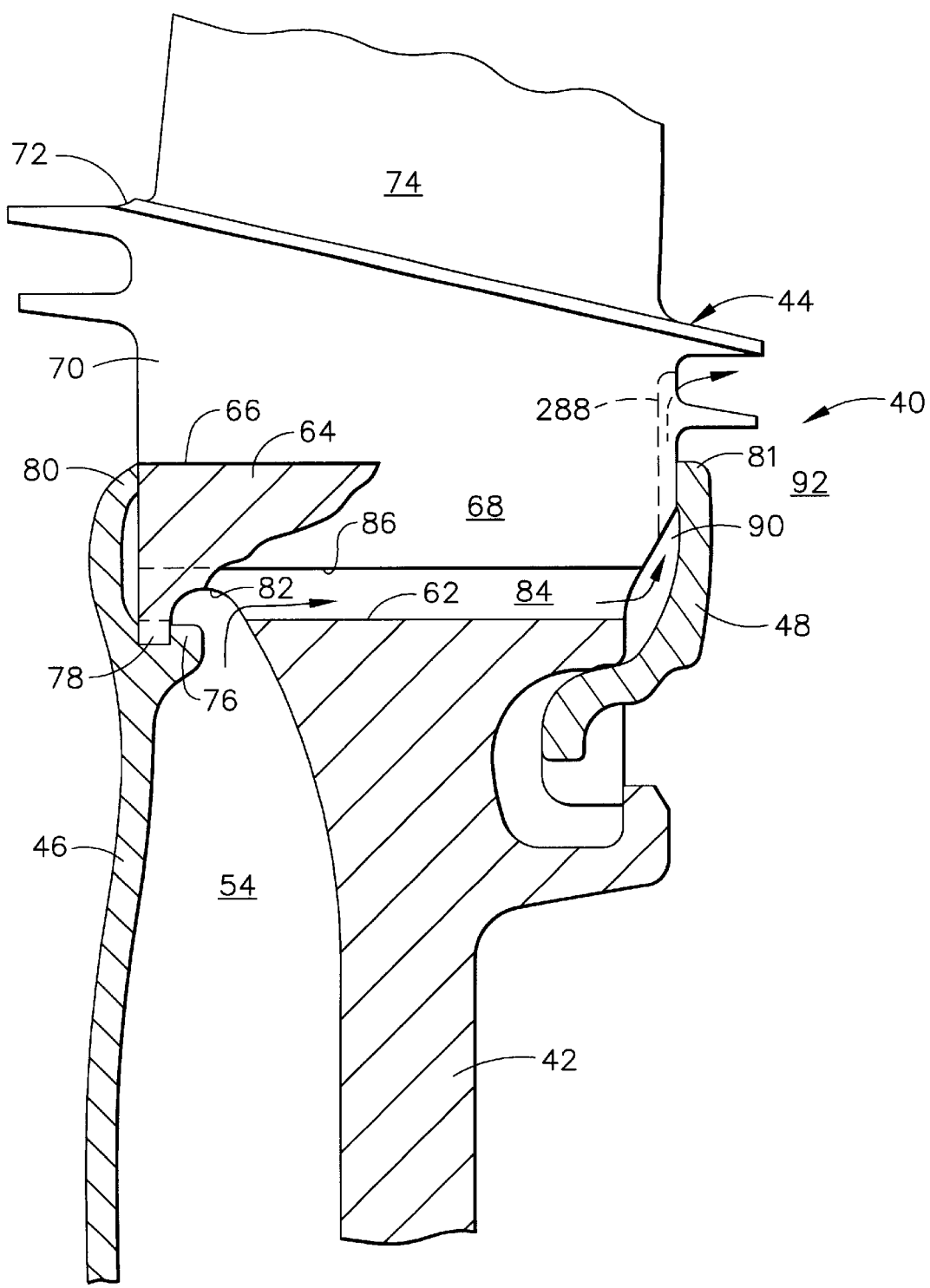
FIG. 5 is a detailed cross-sectional view of a low pressure turbine showing another alternative embodiment of a wheel cavity purging system.

Turning to FIG. 5, another alternative embodiment of the present invention is shown. Here, each blade 44 has a substantially radially extending purge slot 288 formed in the aft surface thereof, with the purge slots 288 facing the aft retainer 48. Specifically, each purge slot 288 is formed in the aft surface of the dovetail portion 68 and the shank portion 70 of the corresponding blade 44. A first end of each purge slot 288 is located at a point radially inward of the outer edge 81 of the aft retainer 48 and is in fluid communication with a corresponding one of the plenums 84 via an annular gap 90 formed between the aft retainer 48 and the rotor disk 42. The second end of each purge slot 288 is located at a point on the aft surface of the shank portion 70 that is radially outward of the outer edge 81 and in fluid communication with a wheel cavity 92 located between the first stage low pressure rotor 40 and the low pressure stator 56. Accordingly, the purge slots 288 radially traverse the outer edge 81 of the aft retainer 48 and provide fluid communication between the plenums 84 and the wheel cavity 92. As in the prior embodiments, the purge slots 288 are preferably angled circumferentially in the direction of rotor rotation. During engine operation, cooling air from the plenum 54 is directed into the plenums 84, and a portion of this air flows through the gap 90 and the purge slots 288 into the wheel cavity 92 where it combines with any seal leakage to purge the wheel cavity 92 and prevent hot gas ingestion. Alternatively, the purge slots 288 could be formed in the aft surfaces of the disk posts 64 instead of the blades 44.

While various embodiments of the present invention have been described in which purge slots are provided in axial surfaces of the blades or the disk posts, it should be noted that purge slots could alternatively be formed in the outer edge of the forward or aft retainers. Furthermore, while the present invention has been fully described in connection with the first stage low pressure turbine rotor 40, it should be understood that the present invention is equally applicable to other turbine rotors such as the high pressure rotor 22. In the high pressure rotor 22, purge slots would be formed in the forward surfaces of the blades 26 or the disk posts of rotor disk 24 so that cooling air from the plenum 38 could be directed to the wheel cavity 36 located between the high pressure rotor 22 and the high pressure stator 18 in a manner similar to that described above. Alternatively, purge slots could be formed in the aft surfaces of the blades 26 or the disk posts of rotor disk 24 so that cooling air from the plenum 38 could be directed past the aft retainer 30 and into the wheel cavity 52 located between the high pressure rotor 22 and the low pressure rotor 40.

The foregoing has described a turbine rotor that provides a flow of cooling air for adequately purging adjacent wheel cavities. While specific embodiments of the present invention have been described, it will be apparent to those skilled in the art that various modifications thereto can be made without departing from the spirit and scope of the invention as defined in the appended claims.

What is claimed is:

1. A turbine rotor having a primary gas stream passing therethrough and a wheel cavity located adjacent thereto, said wheel cavity being in fluid communication with said primary gas stream, said turbine rotor comprising:

rotor disk having at least one disk slot formed therein;

a blade having internal cooling passages disposed in said disk slot, wherein a plenum in fluid communication with said internal cooling passages is defined by said disk slot and said blade; and means for directing air from said plenum to said wheel cavity.

2. The turbine rotor of claim 1 wherein said means for directing air comprises a purge slot formed in a forward surface of said blade.

3. The turbine rotor of claim 2 further comprising a retainer attached to said disk and having an outer edge in contact with said forward surface of said blade, wherein said purge slot radially traverses said outer edge of said retainer.

4. The turbine rotor of claim 1 wherein said means for directing air comprises a purge slot formed in an aft surface of said blade.

5. The turbine rotor of claim 4 further comprising a retainer attached to said disk and having an outer edge in contact with said aft surface of said blade, wherein said purge slot radially traverses said outer edge of said retainer.

6. The turbine rotor of claim 1 wherein said means for directing air comprises a purge slot formed in a forward surface of said disk.

7. The turbine rotor of claim 6 further comprising a retainer attached to said disk and having an outer edge in contact with said forward surface of said disk, wherein said purge slot radially traverses said outer edge of said retainer.

8. The turbine rotor of claim 1 wherein said means for directing air comprises a purge slot formed in an aft surface of said disk.

9. The turbine rotor of claim 8 further comprising a retainer attached to said disk and having an outer edge in contact with said aft surface of said disk, wherein said purge slot radially traverses said outer edge of said retainer.

10. A turbine rotor having a primary gas stream passing therethrough and a wheel cavity located adjacent thereto, said wheel cavity being in fluid communication with said primary gas stream, said turbine rotor comprising:
- a rotor disk rotatable about a centerline axis and having a plurality of circumferentially alternating dovetail slots and disk posts disposed about its periphery;
- a plurality of blades, each one of said blades having a dovetail portion disposed in a corresponding one of said dovetail slots, a shank portion extending from said dovetail portion and internal cooling passages;
- a plurality of axially extending plenums defined by said dovetail slots and said dovetail portions, wherein said axially extending plenums receive cooling air during operation of the engine and are in fluid communication with said internal cooling passages;
- a retainer attached to said rotor disk and having an outer edge in contact with said blades and said disk posts; and
- means for directing air from said plurality of axially extending plenums to said wheel cavity.

11. The turbine rotor of claim 10 wherein said means for directing air comprises a purge slot formed in a forward surface of each one of said blades and facing said retainer, wherein each one of said purge slots radially traverses said outer edge of said retainer.

12. The turbine rotor of claim 11 wherein each one of said purge slots is disposed at an angle to a radius drawn from said centerline axis.

13. The turbine rotor of claim 10 wherein said means for directing air comprises a purge slot formed in an aft surface of each one of said blades and facing said retainer, wherein each one of said purge slots radially traverses said outer edge of said retainer.

14. The turbine rotor of claim 13 wherein each one of said purge slots is disposed at an angle to a radius drawn from said centerline axis.

15. The turbine rotor of claim 10 wherein said means for directing air comprises a purge slot formed in a forward surface of each one of said disk posts and facing said retainer, wherein each one of said purge slots radially traverses said outer edge of said retainer.

16. The turbine rotor of claim 15 wherein each one of said purge slots is disposed at an angle to a radius drawn from said centerline axis.

17. The turbine rotor of claim 10 wherein said means for directing air comprises a purge slot formed in an aft surface of each one of said disk posts and facing said retainer, wherein each one of said purge slots radially traverses said outer edge of said retainer.

18. The turbine rotor of claim 17 wherein each one of said purge slots is disposed at an angle to a radius drawn from said centerline axis.

19. In a gas turbine engine having a primary gas stream and a turbine rotor including a rotor disk having at least one disk slot formed therein and a blade having internal cooling passages disposed in said disk slot and a wheel cavity adjacent said turbine rotor and in fluid communication with said primary gas stream, a method of purging said wheel cavity comprising the steps of:
- forming a plenum between said disk slot and said blade, said plenum being in fluid communication with said internal cooling passages;
- delivering cooling air to said plenum; and
- directing cooling air from said plenum to said wheel cavity.

* * * * *